US008744125B2

(12) United States Patent
Zhu et al.

(10) Patent No.: US 8,744,125 B2
(45) Date of Patent: Jun. 3, 2014

(54) CLUSTERING-BASED OBJECT CLASSIFICATION

(75) Inventors: Hongwei Zhu, Fresno, CA (US); Farzin Aghdasi, Clovis, CA (US); Greg Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 115 days.

(21) Appl. No.: 13/338,617

(22) Filed: Dec. 28, 2011

(65) Prior Publication Data

US 2013/0170696 A1    Jul. 4, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 7,356,425 | B2 | 4/2008 | Krahnstoever et al. |
| 7,391,907 | B1 | 6/2008 | Venetianer et al. |
| 8,059,154 | B1 | 11/2011 | Kiro et al. |
| 2004/0105570 | A1 | 6/2004 | Venerianer et al. |
| 2007/0274563 | A1* | 11/2007 | Jung et al. ................ 382/103 |
| 2008/0095403 | A1 | 4/2008 | Benhammou |
| 2008/0291278 | A1 | 11/2008 | Zhang et al. |
| 2010/0054535 | A1 | 3/2010 | Brown et al. |
| 2010/0066828 | A1 | 3/2010 | Disaro et al. |
| 2010/0103266 | A1 | 4/2010 | Merkel et al. |
| 2010/0245576 | A1 | 9/2010 | Inui et al. |
| 2011/0050897 | A1 | 3/2011 | Cobb et al. |
| 2011/0128388 | A1 | 6/2011 | Pai et al. |
| 2011/0149041 | A1 | 6/2011 | Eccles et al. |
| 2012/0170802 | A1 | 7/2012 | Millar et al. |
| 2012/0293663 | A1 | 11/2012 | Liu et al. |

FOREIGN PATENT DOCUMENTS

EP    1873716 A1    1/2008

OTHER PUBLICATIONS

Bose, Biswajit, and Eric Grimson. "Learning to use scene context for object classification in surveillance." Proc. Joint IEEE Int'l Workshop on VS-PETS, Nice, France, p. 94-101. 2003.*

Johannes Schels et al., "Self-calibrating 3D context for retrieving people with luggage", Computer Vision Workshops (ICCV Workshops), 2011 IEEE International Conference on, IEEE, Nov. 6, 2011, pp. 1920-1927.

T Chen et al., "Accurate self-calibration of two camers by observations of a moving person on a ground plane", IEEE Conference on Advanced Video and Signal Based Surveilance, Jan. 1, 2007, pp. 129-134.

Tu, P. H. et al., "An intelligent video framework for homeland protection", Proc. of Spie (Unattended Ground, Sea and Air Sensor Technologies and Applications, IX), vol. 6562, 2007.

(Continued)

*Primary Examiner* — Nirav G Patel
(74) *Attorney, Agent, or Firm* — Hunter Clark PLLC

(57) ABSTRACT

An example of a method for identifying objects in video content according to the disclosure includes receiving video content of a scene captured by a video camera, detecting an object in the video content, identifying a track that the object follows over a series of frames of the video content, extracting object features for the object from the video content, and classifying the object based on the object features. Classifying the object further comprises: determining a track-level classification for the object using spatially invariant object features, determining a global-clustering classification for the object using spatially variant features, and determining an object type for the object based on the track-level classification and the global-clustering classification for the object.

20 Claims, 9 Drawing Sheets

(56) References Cited

OTHER PUBLICATIONS

D-T Lin et al., "Pedestrian and Vehicle Classification Surveilance System for Street-Crossing Safety", The 2011 International Conference on Image Processing, Computer Vision, and Pattern Recognition (IPCV'11), Jul. 19, 2011.

International Search Report and Written Opinion—PCT/US2012/069148—ISA/EPO—Jul. 25, 2013.
International Search Report and Written Opinion—PCT/US2012/071608—ISA/EPO—Mar. 21, 2013.
Non-Final Office Action for Related U.S. Appl. No. 13/338,555—Feb. 13, 2014.

* cited by examiner

CLUSTERING-BASED OBJECT CLASSIFICATION

CROSS-REFERENCE TO RELATED APPLICATION

The present application is related to U.S. patent application Ser. No. 13/338,555, filed Dec. 28, 2011, entitled "CAMERA CALIBRATION USING FEATURE IDENTIFICATION", the content of which is hereby incorporated by reference in its entirety.

BACKGROUND

Video surveillance systems are used to capture video content of a number of public, private, and government locations. For example, video surveillance system are commonly used in airports, train stations, stores and shopping centers, factories, and other locations with the presence of people, vehicles, etc. The cameras can capture extensive amounts of video content and the content may be recorded and stored by the surveillance system for a period of time so that the past presence of people, vehicles, etc. can be identified. Manually searching recorded video content captured by a video surveillance system can be extremely labor intensive and time consuming. Video analytics algorithms have been developed that can be used to extract high-level information from the video content captured by the video cameras have been developed. The video analytics algorithms can be used to identify objects in this video content that has been captured. Objects in the video content must be identified and classified if a user would like to be able to conduct searches on the video content. For example, a user may wish to search for video content that shows vehicles entering or exiting a facility during a predetermined period of time. If the objects, such as vehicles and people, have been identified in the captured video content, search algorithms can be used to identify potentially relevant content without requiring that the user manually review all of the video content captured during the period of interest.

Video analytics algorithms can help to automate object classification. Object classification can include several aspects: (1) feature calculations and (2) feature-based classification. In general, various object features can be used for object classification. An example of conventional approach to object classification can be found in U.S. Pat. No. 7,391,907, titled "Spurious Object Detection in a Video Surveillance System," to Venetianer et al., which discusses a system that uses comprehensive set metrics of related to object features including: a shape consistency metric, a size consistency metric, a size metric, a texture consistency metric, a color consistency metric, a speed consistency metric, a direction of motion consistency metric, a salient motion metric, an absolute motion metric, and a persistent motion metric. Without camera calibration information, it is difficult to effectively take into consideration all these metrics for object classification. As a result, only a few selected features are usually used in practical applications. The features which are commonly used in conventional systems are object size, and object aspect ratio (height vs. width), and object shape. For example, the object aspect ratio of a person and a car are usually very different and can serve as a discriminative feature to distinguish between person and a car in video content. Object aspect ratio can be viewed as a simplified shape feature if it is treated as an approximation of the ratio of the major axis length and the minor axis length of the fitted ellipse of an object.

Sophisticated features are of more and more interest in the computer vision society for object detection, classification, including wavelets (i.e., Haar feature), bag of visual words, scale-invariant feature transform (SHIFT) features (or its simplified version SURF), HoF (histogram of optical flow), HoG (histogram of oriented gradients). These features have been proven effective theoretically in a broad range of applications include video surveillance. However, so far very few practical systems have existed in the video surveillance domain, which employ these features, which could be due to the complexity, inefficiency, or unsuitability.

Published U.S. Patent Application No. US2010/0054535A1, titled "Video Object classification," to Brown et al. discusses computing the difference of histograms of oriented gradients (HoG) for each tracked object over video sequence, and monitor the deformation level between vehicles and people (the level of deformation of a person is considered higher than that of a vehicle), and classify tracked objects through a Maximum A Posterior (MAP) approach. This approach requires objects to be tracked and classified have a reasonable large size to allow the calculation of histograms, which is not suitable to applications where objects are small or far from cameras. This method requires calibration information. Also, due to the use of MAP, likelihood and prior probabilities over the scene are required at the beginning for each object type, which is impractical for many surveillance applications involving a large number of cameras. In addition, this method does not classify an object until the track of the object is finished, i.e., just when the object disappears. As result, this method does not work for applications that require real-time alerts on object types.

Among object type classifiers, mainly there are two categories of approaches used for video surveillance applications: non-learning based and learning based, which are applied to a set of selected object features. Non-learning based classifiers assume the available granularities of selected features for each of object types of interest, and calculate the distance between feature values and reference (prototype) values and make classification decision accordingly. Non-learning based classifiers are prone to be sensitive to changes in camera's setup, lighting, and image noise, and may set constraints when applied to video surveillance applications.

Learning based classifiers include supervised methods and unsupervised methods. Supervised methods (e.g., nearest neighbors, neural networks, and support vector machines) require training data for each class. The training process can be time-consuming and is required to implement offline for each of surveillance cameras. To enable an existing classifier work for changes involved in a system, such as due to camera movements, illumination conditions, video noise, or adding new object feature, a new or additional training process is required for supervised approaches. This can limit the application of learning based classifiers to edge-device based video applications that usually have restrictive resources in terms of processing power and memory.

Unsupervised methods, e.g., self-organizing map (SOM), adaptive resonance theory (ART) network do not require training data. The methods can build classifiers on the fly, and this type of classifier offers better adaptability than both supervised and non-learning approaches, but the unsupervised methods can suffer the problem of drifting in object classification, and special care is required to prevent drifting in object classification from occurring.

Published U.S. Patent Application No. 2011/0050897A1 titled "Visualizing and Updating Classification in a Video Surveillance System," to Cobb et al., discusses a method for object classification by applying an Adaptive Resonance Theory (ART) network to the resulting nodes from self-organizing map (SOM) neural network. The SOM-ART network processes the pixel-level micro-features to adaptively learn and organize the micro-features into object types clusters. This is an unsupervised learning approach, and requires no training data. In addition to its high demands of resources in processing power and memory, this method provides no effective way to make use of the important property: a tracked object has a same object type over the scene. Moreover, it requires manual assignment to map from resultant clusters to meaningful objects types.

SUMMARY

An example of a method for identifying objects in video content according to the disclosure includes receiving video content of a scene captured by a video camera, detecting an object in the video content, identifying a track that the object follows over a series of frames of the video content, extracting object features for the object from the video content, and classifying the object based on the object features. Classifying the object further comprises: determining a track-level classification for the object using spatially invariant object features, determining a global-clustering classification for the object using spatially variant features, and determining an object type for the object based on the track-level classification and the global-clustering classification for the object.

Implementations of such a method may include one or more of the following features. Determining a track-level classification for the object further comprises determining the track-level classification for the object based on aspect ratios associated with the object. Determining the track-level classification for the object further comprises determining the track-level classification for the object based on the aspect ratio associated with the object and a directional aspect ratio associated with the object. Determining the track-level classification for the object includes: constructing directional clusters associated with the aspect ratio for the tracked object, and constructing directional clusters associated with directional aspect ratio for the tracked object, and determining the track-level classification for the object based on the directional clusters associated with the aspect ratio and the directional clusters associated with directional aspect ratio, and updating a histogram of track-level classification results for the tracked object based on the track-level classification. Determining the global-clustering classification for the object further comprises determining the global-clustering classification for the object based on a size of the object. Determining the global-clustering classification for the object further includes: updating local models of object size for locations visited by a persistently tracked object, updating global clusters by associating local models with the global clusters, the local models having an object size matching that associated with the global cluster and are visited by the persistently tracked object. Updating the global clusters includes: updating a histogram of track-level classification results associated with matched objects; updating directional clusters based on the matched objects, the directional clusters being associated with directional aspect ratio and aspect ratio of tracked objects; creating a feature map of object size for each global cluster to resolve conflicts in global cluster merges; and creating cluster-to-type mapping to convert a global cluster to a determined object type. Determining whether the object has moved consistently in one direction for at least a predetermined threshold distance, and if the object has not moved more than the predetermined threshold distance, determining the object type for the object based on the global-clustering classification and not the track-level classification of the object.

An example of a surveillance system configured to identify objects in video content captured by a video camera according to the disclosure includes means for receiving video content of a scene captured by a video camera, means for detecting an object in the video content, means for identifying a track that the object follows over a series of frames of the video content, means for extracting object features for the object from the video content, and means for classifying the object based on the object features. Classifying the object includes: means for determining a track-level classification for the object using spatially invariant object features, means for determining a global-clustering classification for the object using spatially variant features, and means for determining an object type for the object based on the track-level classification and the global-clustering classification for the object.

Implementations of such a surveillance system may include one or more of the following features. The means for determining a track-level classification for the object further comprises means for determining the track-level classification for the object based on aspect ratios associated with the object. The means for determining the track-level classification for the object further comprises means for determining the track-level classification for the object based on the aspect ratio associated with the object and a directional aspect ratio associated with the object. The means for determining the track-level classification for the object includes: means for constructing directional clusters associated with the aspect ratio for the tracked object, means for constructing directional clusters associated with directional aspect ratio for the tracked object, and means for determining the track-level classification for the object based on the directional clusters associated with the aspect ratio and the directional clusters associated with directional aspect ratio, and means for updating a histogram of track-level classification results for the tracked object based on the track-level classification. The means for determining the global-clustering classification for the object includes means for determining the global-clustering classification for the object based on a size of the object. The means for determining the global-clustering classification for the object includes: means for updating local models of object size for locations visited by a persistently tracked object, means for updating global clusters by associating local models with the global clusters, the local models having an object size matching that associated with the global cluster and are visited by the persistently tracked object. The means for updating the global clusters includes: means for updating a histogram of track-level classification results associated with matched objects, means for updating directional clusters based on the matched objects, the directional clusters being associated with directional aspect ratio and aspect ratio of tracked objects, means for creating a feature map of object size for each global cluster to resolve conflicts in global cluster merges, and means for creating cluster-to-type mapping to convert a global cluster to a determined object type. Means for determining whether the object has moved consistently in one direction for at least a predetermined threshold distance, and means for determining the object type for the object based on the global-clustering classification and not the track-level classification of the object if the object has not moved more than the predetermined threshold distance.

An example of a surveillance system configured to identify objects in video content captured by a video camera according to the disclosure includes a tangible, non-transitory computer-readable memory, a plurality of modules comprising processor executable code stored in the memory, a processor connected to the memory and configured to access the plurality of modules stored in the memory, a video processing module. The video processing module is configured to: receive video content of a scene captured by a video camera, detect an object in the video content, identify a track that the object follows over a series of frames of the video content, extract object features for the object from the video content, and classify the object based on the object features. To classify the object the video processing module is further configured to: determine a track-level classification for the object using spatially invariant object features, determine a global-clustering classification for the object using spatially variant features, and determine an object type for the object based on the track-level classification and the global-clustering classification for the object.

Implementations of such a surveillance system may include one or more of the following features. The video processing module being configured to determine a track-level classification for the object further is further configured to determine the track-level classification for the object based on aspect ratios associated with the object. The video processing module being configured to determine the track-level classification for the object is further configured to determine the track-level classification for the object based on the aspect ratio associated with the object and a directional aspect ratio associated with the object. The video processing module being configured to determine the track-level classification for the object is further configured to: construct directional clusters associated with the aspect ratio for the tracked object, and construct directional clusters associated with directional aspect ratio for the tracked object, and determine the track-level classification for the object based on the directional clusters associated with the aspect ratio and the directional clusters associated with directional aspect ratio, and update a histogram of track-level classification results for the tracked object based on the track-level classification. The video processing module being configured to determine the global-clustering classification for the object is further configured to determine the global-clustering classification for the object based on a size of the object. The video processing module being configured to determine the global-clustering classification for the object is further configured to: update local models of object size for locations visited by a persistently tracked object, update global clusters by associating local models with the global clusters, the local models having an object size matching that associated with the global cluster and are visited by the persistently tracked object. The video processing module being configured to update the global clusters is further configured to: update a histogram of track-level classification results associated with matched objects, update directional clusters based on the matched objects, the directional clusters being associated with directional aspect ratio and aspect ratio of tracked objects, create a feature map of object size for each global cluster to resolve conflicts in global cluster merges, and create cluster-to-type mapping to convert a global cluster to a determined object type. The video processing module is further configured to: determine whether the object has moved consistently in one direction for at least a predetermined threshold distance; and determine the object type for the object based on the global-clustering classification and not the track-level classification of the object if the object has not moved more than the predetermined threshold distance.

An example of a tangible computer-readable medium, having stored thereon computer-readable instructions identifying objects in video content, according to the disclosure includes instructions configured to cause a computer to: receive video content of a scene captured by a video camera; detect an object in the video content; identify a track that the object follows over a series of frames of the video content; extract object features for the object from the video content; and classify the object based on the object features. The instructions to classifying the object include instructions to: determine a track-level classification for the object using spatially invariant object features, determine a global-clustering classification for the object using spatially variant features, and determine an object type for the object based on the track-level classification and the global-clustering classification for the object.

Implementations of such a surveillance system may include one or more of the following features. The code to cause the computer to determine a track-level classification for the object further comprises code to cause the computer to determine the track-level classification for the object based on aspect ratios associated with the object. The code to cause the computer to determine the track-level classification for the object further comprises code to cause the computer to determine the track-level classification for the object based on the aspect ratio associated with the object and a directional aspect ratio associated with the object. The code to cause the computer to determine the track-level classification for the object includes code to cause the computer to: construct directional clusters associated with the aspect ratio for the tracked object, construct directional clusters associated with directional aspect ratio for the tracked object, determine the track-level classification for the object based on the directional clusters associated with the aspect ratio and the directional clusters associated with directional aspect ratio, and update a histogram of track-level classification results for the tracked object based on the track-level classification. The code to cause the computer to determine the global-clustering classification for the object further comprises code to cause the computer to determine the global-clustering classification for the object based on a size of the object. The code to cause the computer to determine the global-clustering classification for the object includes code to cause the computer to: update local models of object size for locations visited by a persistently tracked object, update global clusters by associating local models with the global clusters, the local models having an object size matching that associated with the global cluster and are visited by the persistently tracked object. The code to update the global clusters further comprises: update a histogram of track-level classification results associated with matched objects, update directional clusters based on the matched objects, the directional clusters being associated with directional aspect ratio and aspect ratio of tracked objects, create a feature map of object size for each global cluster to resolve conflicts in global cluster merges, and create cluster-to-type mapping to convert a global cluster to a determined object type. Code to cause the computer to determine: determine whether the object has moved consistently in one direction for at least a predetermined threshold distance; and determine the object type for the object based on the global-clustering classification and not the track-level classification of the object if the object has not moved more than the predetermined threshold distance.

DETAILED DESCRIPTION

Figure 1:
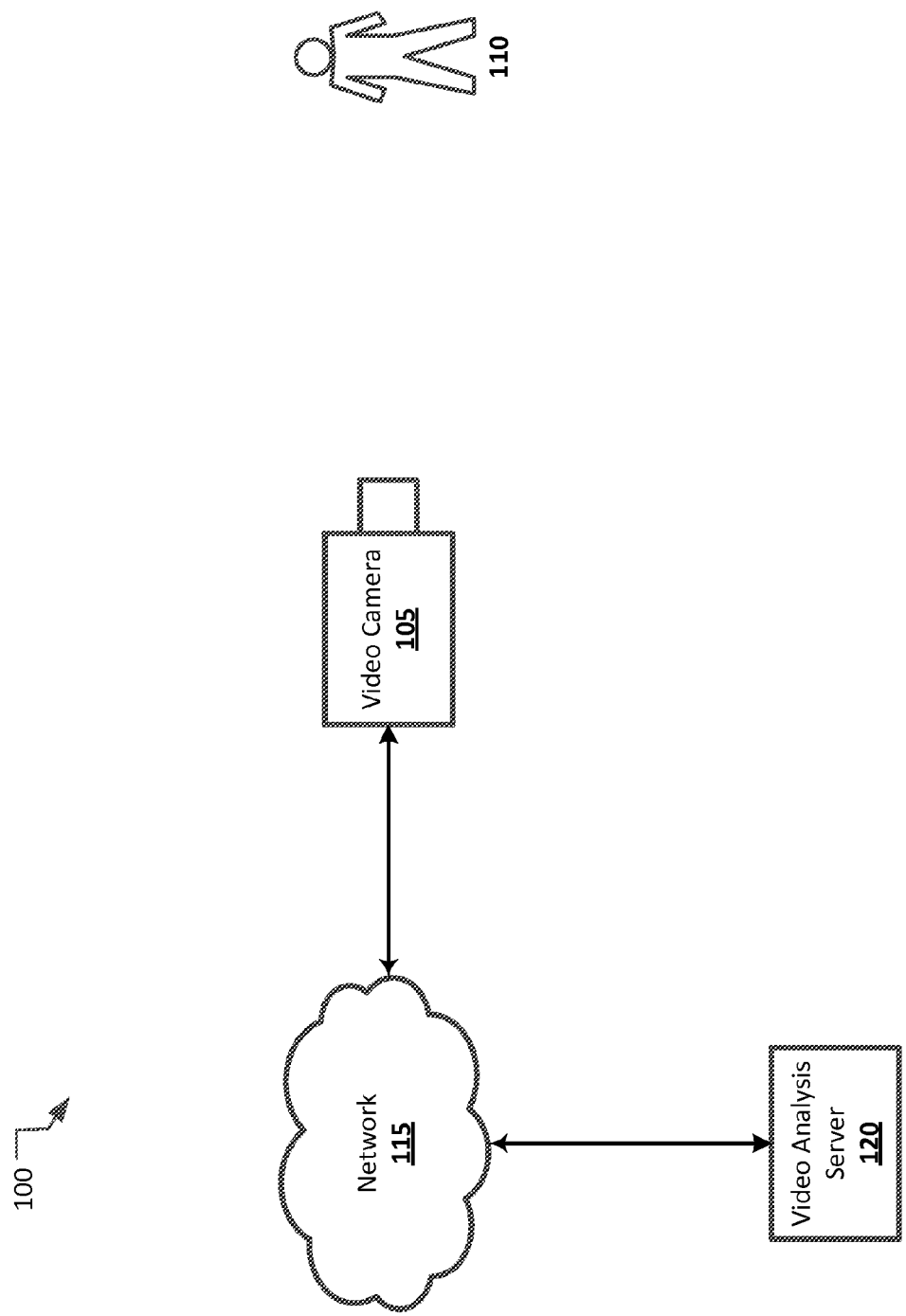
FIG. 1 is block diagram of a video surveillance system 100 that can be used to implement the techniques disclosed herein.

Techniques for clustering-based object classification for fixed-position surveillance cameras are described herein. Determining an object type of objects appearing in the field of a view of a surveillance camera is an important aspect of video analytics processing of video content captured by the surveillance camera. Video surveillance applications can use the object type of detected objects to determine what sort of processing and/or response that the surveillance system should take in response to the detected objects. For example, the video surveillance software can be configured to trigger an alarm in response to detecting certain types of objects at a specific location being monitored. In one example, the video surveillance software can be configured to detect the presence of a person in a bank vault or other restricted area where the presence of a person should trigger an alarm or alert security staff of the unauthorized presence. The video surveillance software can also be configured to search for events related to a specific type of object. For example, video surveillance software can be configured to identify the arrival and departure large trucks at a particular site. In another example, the video surveillance software can be configured to count the number of people present at a retail store or to count the number of cars in a parking lot.

Conventional approaches to object classification in video content require a lot of manual effort from users. The effectiveness of the conventional approaches often depends on preset reference values that must be defined for selected features associated with each object type of interest. For example, these reference values can include the size and aspect ratio of an average-sized person, car, van, or truck. To make use of these reference values, certain assumptions are typically made. For example, the video surveillance software in a conventional system typically requires that the setup of the cameras be kept unchanged so that the data for objects extracted from the video content is not polluted by noise in the scene. Even slightly moving the camera make preset reference values invalid, since the present references values may no longer agree with the new camera setup.

Furthermore, large shadows and reflections can interfere with the conventional techniques for extracting and classifying objects in the scene being monitored. For example, a set of reference values for detecting objects in an outdoor scene, such as size and aspect ratio parameters, that work for a cloudy day may not work for a sunny day, because shadows can cause significant differences in an object's size and aspect ratio as perceived by the video analytics algorithm. In another example, reference feature values that are selected for a daytime scene may not apply to a nighttime scene. Lights from passing vehicles can cause errors in object detection by conventional video analytics algorithms. Large changes in object features can also cause conventional algorithms to incorrectly classify objects.

Object Features

The techniques disclosed herein provide improved object classification by classifying objects using two different types of visual features: (1) spatially variant features, and (2) spatially invariant features. Spatially variant features change with respect to the object's position within the scene being monitored. Examples of spatially variant features include object size, width, and height. In many video surveillance applications, the cameras are directed down-forward, meaning that the camera is angled somewhat downward toward a scene in front of the camera (e.g., as opposed to facing straight downward or straight forward toward the scene). As a result of the camera's perspective view of the scene, spatially variant features, such as the object size, width, and height can change as the object moves in relation to the camera. Spatially invariant features are features associated with objects that do not change as the object's location in the scene changes relative to the camera. Examples of spatially invariant features include the shape and the aspect ratio of an object.

The object classification techniques disclosed herein can classify objects based on a track-level summarization of spatially invariant features associated with objects extracted from the video content. A track represents a sequence of visual objects of the same subject in a camera's field of view from the time that the object first appears in the camera's field of view to the object disappearing from the camera's field of view. In an example, a video camera can be positioned to monitor a parking lot, and the video analytics algorithms of the surveillance system can be configured to identify a car in the video content captured by the camera based on the aspect ratio, the shape, and/or other invariant features when the car enters the field of view of the camera.

Using the observed invariant features, the video analytics algorithms can build a track that represents a sequence of visual objects detected in the frames of the video content captured by the video camera. The video analytics algorithm can construct the track by identifying an association between visual objects detected in different frames of the video content by comparing the invariant features of the objects in the two frames. If the invariant features of the visual objects match, then the visual objects in each of the frames are likely to represent the same object from the scene. Returning to the example where a car entered into the field of view of a video camera, the video analytics algorithms can construct a track that represents the car's progress through the scene being monitored over a series of frames of the video content captured by the video camera. The video analytics algorithms can identify visual object representing the car over a series of frame of video content and make a determination that those visual objects represent the same object, the car, by comparing the invariant features of the visual objects, such as the aspect ratio and/or the shape of the visual objects, to determine that the visual objects represent the same object.

The object classification techniques disclosed herein can also classify object through scene-level object clustering.

Visual objects detected in the video content can be classified by determining a cluster to which an object belongs. The video analytics algorithms can associate visual objects with a cluster by examining the spatially variant features of the objects. For example, the object size, width, and height can be used to determine to which cluster an object belongs.

The techniques disclosed herein can make use of both the track-based classifications and cluster-based classifications to provide for robust decision regarding the object type of object identified in the video content captured by the video camera.

The techniques disclosed herein can use various object features for classifying objects, including: (1) object size: the area (number of pixels) that represent a particular object in the video content at a particular point in time, (2) object aspect ratio: the ratio of the object's height to the object's width (height and width can be represented as a number of pixels), and (3) directional aspect ratio of an object: the ratio of object length in the perpendicular direction vs. that in the parallel direction of the salient move direction of an object. A salient move direction for an object represents a direction along which the object has moved consistently a significant distance in a direction. A threshold distance that an object must move before the object is considered to have moved a sufficient distance to be considered as salient move can be defined for each implementation. An object can be represented by either a bounding box or its contour, which can derive the above three features for an object.

System Diagram

FIG. 1 is block diagram of a video surveillance system 100 that can be used to implement the techniques disclosed herein. Video surveillance system 100 includes a video camera 105. The video camera 105 is configured to capture video of a scene, to quantize the data, and to transmit the data to video analysis server 120 via network 115. Network 115 can comprise one or more local area networks (LANs), wide area networks (WANs), or a combination thereof. Network 115 can be the Internet. Video analysis server 120 can be configured to execute video analytics algorithms that implement the techniques disclosed herein for classifying object identified in the video content captured by the video camera 105. In the example illustrated in FIG. 1, the video surveillance system 100 includes a single video camera 105, but the video surveillance system can include multiple video cameras 105.

The video camera 105 can be deployed at a fixed location that is to be monitored. For example, the video camera 105 can be deployed in a casino, a store, a shopping mall, a government installation, an industrial complex, an airport, or other location where access to the location is monitored. The video camera 105 can be installed either indoors or outdoors, and can be configured to monitor people, vehicle traffic, or other objects that move across the field of view of the camera. A typical video surveillance system might include hundreds of cameras positioned throughout a facility begin monitored.

The video analysis server 120 can be located at the same site as the video camera 105 or at a remote location. The video analysis server 120 can be located in a security operations center or other location in a location protected from weather and environmental conditions, while the video camera 105 can be located in a location where the camera is subjected to thermal stress, wind, rain, dirt, smoke, pollution, and other environmental conditions.

The video analysis server 120 can be configured to execute video analytics algorithms on video content captured by video camera 105. The video analytics algorithms can implement the techniques disclosed herein for classifying object identified in the video content captured by the video camera 105. The video analytics algorithms can be configured to build a model of the background of the scene being monitored by the video camera 105. The model of the background of the scene can be used by the video analytics algorithms to distinguish between background and foreground objects in the video content received from the video camera. The video analytics algorithms can be configured to construct the background model by analyzing video content captured by the video camera 105 during an initialization period to identify the objects that comprise the background of the scene. The video analysis server 120 can be configured to periodically update the model of the background. Updating the background can enable the analytics algorithms to adjust for changing lighting conditions (e.g., day vs. night) or changing weather conditions (e.g. a cloudy vs. a sunny day).

For example, foreground objects can include people, vehicles, or other objects that the surveillance system 100 is configured to monitor. The analytics algorithms applied by the video analysis server 120 can also identify background objects, such as rocks, trees, building, and other objects that are part of the background and that should not trigger a warning that a suspicious object has been detected. The analytics algorithm can distinguish such background objects from foreground objects, such as people, animals, or vehicles that appear in the scene.

The analytics algorithms can also be configured to identify motion that is part of the background. For example, the analytics algorithms can identify trees moving in the wind or a flag flapping in a breeze and can distinguish this motion from motion in the foreground. As a result, the analytics algorithm can distinguish between motion that is part of the foreground and motion that is part of the background, and allows the analytics algorithms to identify potential threats or events of interest without creating false alarms caused by motion in the background of a scene.

Figure 2:
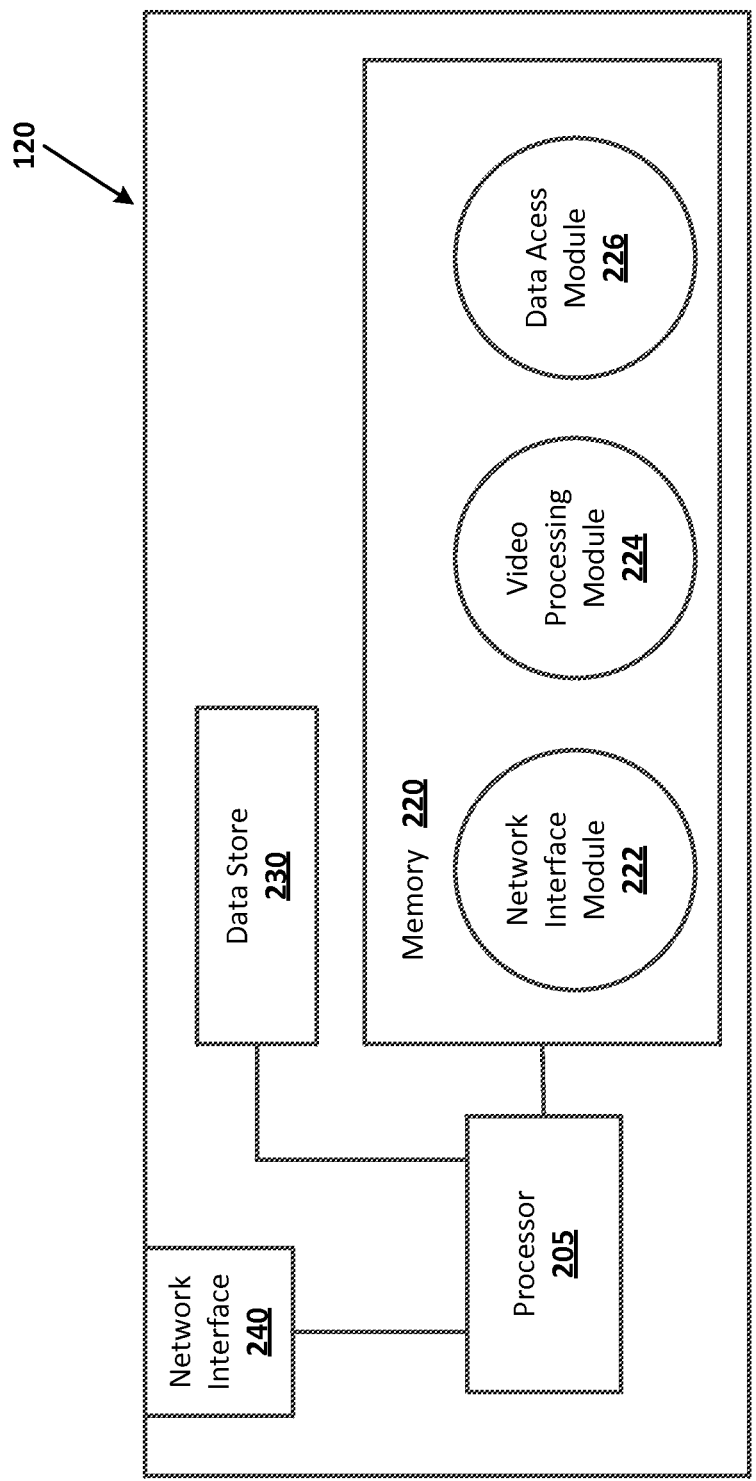
FIG. 2 is a block diagram of a server that can be used to implement the video analysis server illustrated in FIG. 1.

FIG. 2 is a block diagram of an example of the video analysis server 120 illustrated in FIG. 1. Video analysis server 120 includes a processor 205, a memory 220, a data store 230, and a network interface 240. The memory 220 includes a network interface module 222, a video processing module 224, and a data access module 226. The memory 220 can comprise one or more types of tangible, non-transitory computer-readable memory, such as random-access memory (RAM), read-only memory (ROM), flash memory, or a combination thereof. The modules 222, 224, and 226 can comprise processor-executable instructions that can be executed by processor 205.

The processor 205 can comprise one or more microprocessors configured to access memory 220. The processor 205 can read data from and write data to memory 220. The processor 205 can also read executable program code from memory 220 and execute the program code.

Data store 230 can comprise a tangible, non-transitory memory that can be used to store video data, quantization data, and/or other data related received from the video camera 105 via network 115. The data store 230 can also be used to store data generated by the various modules implemented in memory 220 and/or video content received from the video camera 105. In an alternative implementation, the data store 230 can be implemented in memory 230.

The network interface module 222 is configured to receive data from the network 115 via network interface 240. The network interface module 222 can also be configured to transmit information to the video camera 105 or other network-connected devices via network 115.

Video processing module 224 is configured to process video content received from the video camera 105. The video processing module 224 can be configured to receive video content from the video camera 105 and store the video content in the data store 230.

The video processing module 224 can apply one or more video analytics algorithms to the video content received from the video camera 105. The video analytics algorithms can implement the object classification techniques disclosed herein. The video analytics algorithms can also be configured to identify events, such as the presence of a person, vehicle or animal at the location being monitored and to trigger a response to the event, such as sounding an alarm or triggering a relay to perform some actions, such as closing a door.

The video processing module 224 can also be configured to store video content from the video camera 105 in the data store 230. The video processing module 224 can also be configured to store object classification data in the data store 230. For example, the video processing module 224 can be configured to execute video analytics algorithms on video content received from the video camera 105 to classify objects found in the video content. The video processing module 224 can store the object types associated with the video content in the data store 230 to facilitate searches for specific types of objects in the stored video content.

The data access module 226 can be configured to access data stored in the data store 230 and write data to data store 230. The data access module 226 can be configured to read and/or write data to memory 220. The data store 230 can be used to access stored images and background models derived by the video processing module 224 from data received from the video camera 105.

Figure 3:
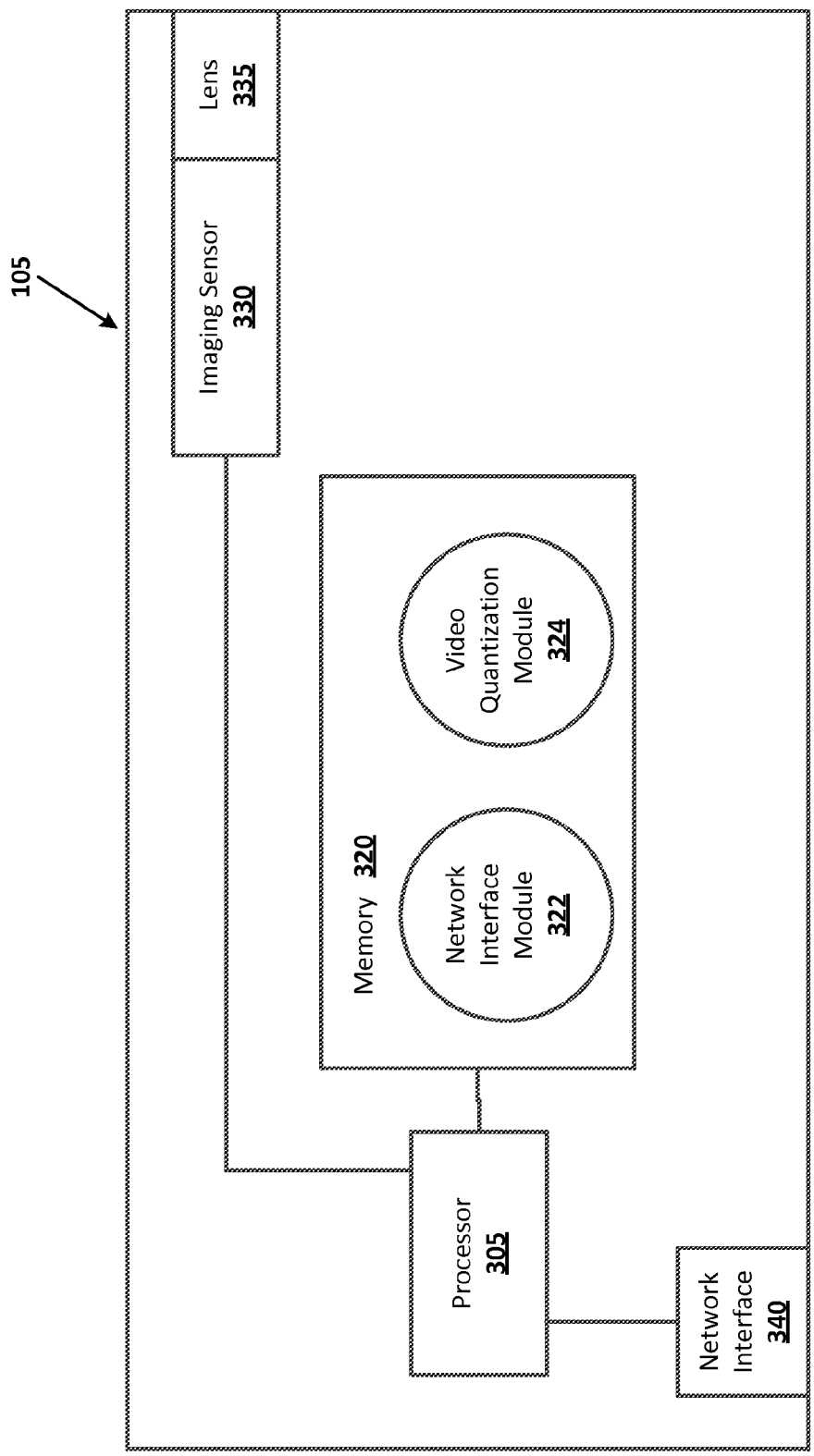
FIG. 3 is a block diagram of a video camera that can be used to implement the video camera illustrated in FIG. 1.

FIG. 3 is a block diagram of an example of the video camera 105 illustrated in FIG. 1. Video camera 105 includes a processor 305, a memory 320, an image sensor 330, a lens 335, and a network interface 340. The memory 320 includes a network interface module 322 and a video quantization module 324. The memory 320 can comprise one or more types of tangible, non-transitory computer-readable memory, such as random-access memory (RAM), read-only memory (ROM), flash memory, or a combination thereof. The modules can comprise processor-executable instructions that can be executed by processor 305.

The lens 335 is configured to capture light received from a scene being monitored by the video camera 105. The lens 335 can focus the received light on the image sensor 330.

The image sensor 330 can be configured to detecting light captured by the lens 335. The image sensor 330 can comprise various types of image sensor, such as digital charge-coupled device (CCD) or complementary metal-oxide-semiconductor (CMOS) active pixel sensors. Other types of image sensors can also be used.

The processor 305 can comprise one or more microprocessors configured to access memory 320. The processor 305 can read data from and write data to memory 320. The processor 305 can also read executable program code from memory 320 and execute the program code. The memory 320 can include a set of modules comprising executable program code that can be executed by the processor 305.

The network interface module 322 is configured to receive data from the network 115 via network interface 340. The network interface module 322 can also be configured to transmit information to the video analysis server 120 or other network-connected devices via network 115.

The video quantization module 324 is configured to process sensor data received from the image sensor 330 to create video content that represents the scene being monitored by the video camera 105.

The video quantization module 324 can be configured to convert a higher-bit video content to a lower-bit video content that can be processed by the video analytics algorithms implemented by the video analysis server 120. For example, the video quantization module 324 can be configured to convert greater than 8-bit video data generated by the thermal sensor, such as 12-bit or 16-bit data, into 8-bit data as expected by the analytics algorithms.

Object Classification

Figure 4:
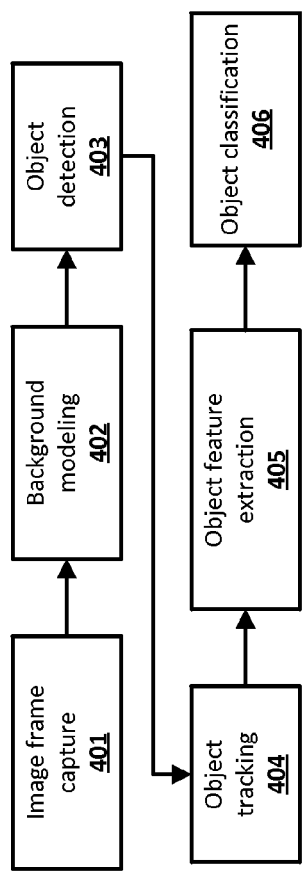
FIG. 4 is a flow diagram of a method for object classification in video content captured by a video camera.

FIG. 4 is a flow diagram of a method for object classification in video content captured by a video camera. Frames of video content are captured by a video camera, such as video camera 105 (stage 401). The captured image frames are processed to model the background of the camera's field of view (stage 402). A model of the background can be created to identify which items in the camera's field of view belong to the background and which are in the foreground. Items in the background, such as trees, rocks, signs, furniture, and other such background items, do not need to be tracked or classified by the video analytics algorithms. Various techniques can be used to develop the model of the background, such as mixture Gaussian model, running average, and non-parametric approaches. Other techniques can also be used to create the model of the background. Once the model of the background has been developed, foreground pixels can then be extracted from the video content captured by the video camera 105 and the foreground pixels can then be grouped together to form motion blocks (stage 403). Objects can then be tracked over successive frames of the video content (stage 404), and object features can be extracted for each tracked object (stage 405). The objects can then be classified using the extracted object features (stage 406).

Figure 5:
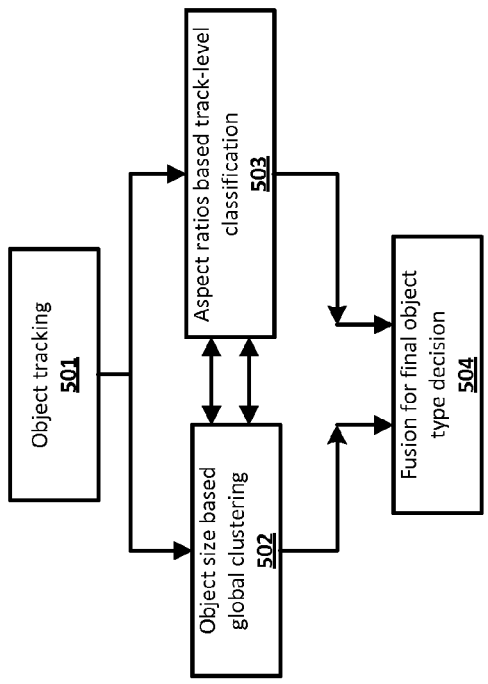
FIG. 5 is a block diagram that illustrates the steps of an example technique for object classification using object features.

FIG. 5 is a block diagram that illustrates the steps of an example technique for object classification using object features. The method includes object tracking (stage 501) that is followed by object-size based global clustering (stage 502) and aspect ratios-based track-level classification (stage 503). The results of the object-size based global clustering and the aspect-ratios based track-level classification are then fused for a final object type decision (stage 504). Each of these stages will be described in greater detail in examples in the subsequent figures.

For every tracked object, the object type can be identified as using the following classification steps: (1) determine which cluster the object belongs to using object size information associated with the object, (2) identify the object-type (if possible) using the object's aspect ratio and directional object aspect ratio of salient move direction, and (3) fuse the results of the global clustering and the track-level classification to determine an object type for the object. The global clusters are identified based on the object size associated with the tracked objects that have appeared in the scene, and each of the global clusters can be mapped to a certain type of object (e.g. person, vehicle, or other types of object). The mapping of the clusters to object type is done automatically. A user does not need to select which cluster an object belongs to.

Figure 6:
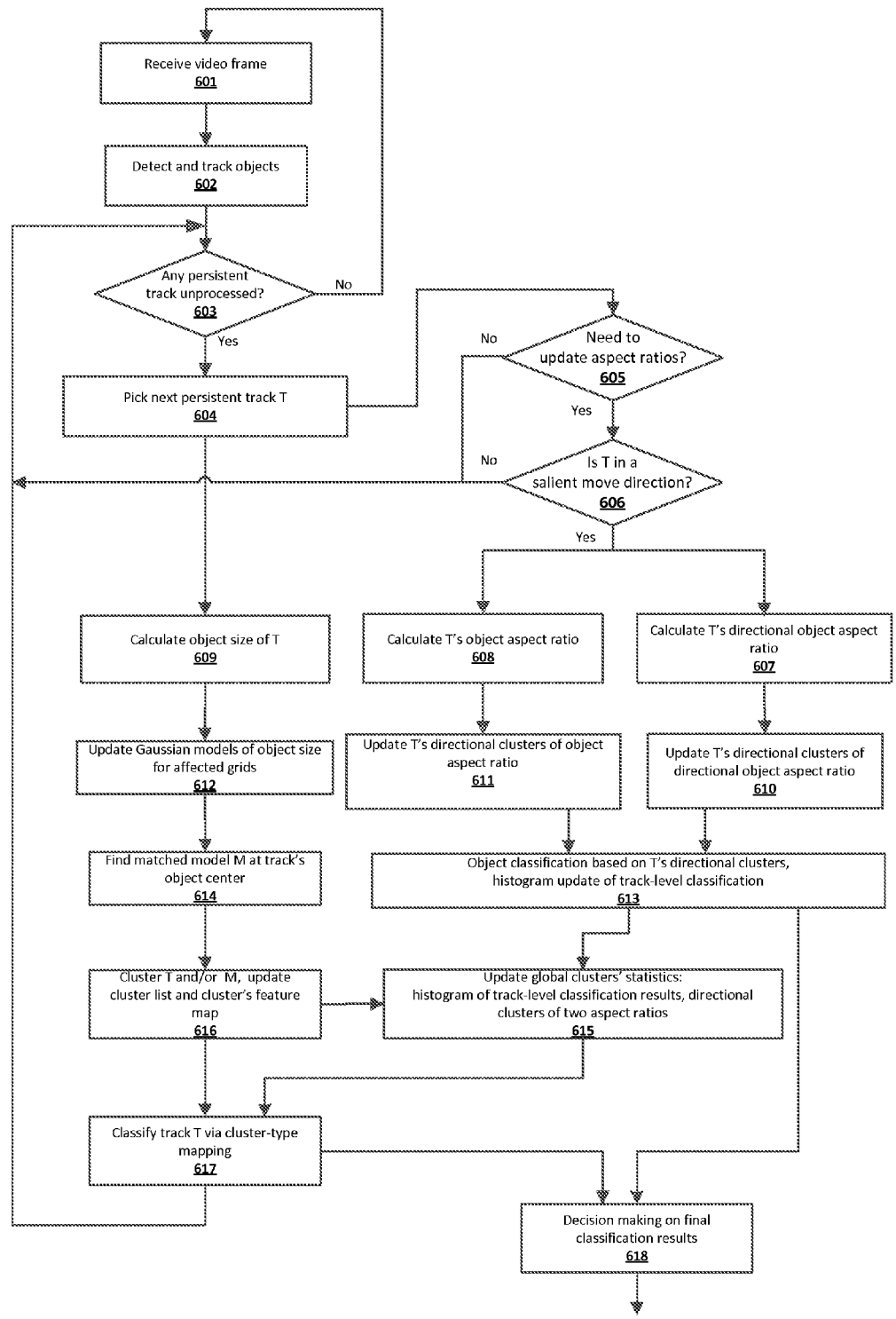
FIG. 6 is a flow diagram of a method for object classification.

FIG. 6 is a flow diagram of a method for object classification. The method illustrated in FIG. 6 can be implemented by the video processing module 224 of the video analysis server 120. The method includes two major parts, a track-level classification portion and a global cluster-based classification portion.

The method begins with receiving a frame of video captured by the video camera 105 (stage 601). The video camera 105 can capture video content and transmit the video content to the video analysis server 120 via network 115.

Objects in the scene can then be extracted and tracked (stage 602). Various techniques known in the art can be used to extract from the frames of video received from the video camera and to track the extracted objects through the scene. A trajectory history can be maintained for each of the objects that are extracted from successive frames of video content. The trajectory history represents the path that the object has taken over time.

A determination can then be made whether there are any persistent object tracks that have not been processed (stage 603). The trajectory history of each of the object extracted from the video content can be examined to determine whether the object has a persistent track. The persistence of the track can be determined based on the size of the objects from frame to frame. A track can be identified as being persistent based on whether the object remains within a predetermined range around an average size for the object. The average size of the object can be calculated over a predetermined number of frames. For example, the average size of the object over at least the last five frames of the video content may be determined. If the size of the object remains constant or changes gradually (less than a predetermined threshold) from frame to frame, the object is determined to have a persistent track from frame to frame. Otherwise, if the change in size of the object exceeds the threshold, the track is determined to not be persistent. The object will continue to be tracked and a new average will be developed over the subsequent frames of video content, but can be discarded as being noise for the purposes of object classification at this point. Some video cameras capture video content at a rate of thirty frames per second. For example, if an object does not appear in a minimum number of frames, the object is not likely to be a real object in the scene and can be discarded as noise.

A yet to be processed persistent object track (T) is selected (stage 604), and a determination is made whether the current location of the object supports updating of the object aspect ratio and directional aspect ratio (stage 605). The update is performed if the object meets all the following conditions: 1) the object has appeared in the scene for at least certain number of frames (e.g., 5 frames); 2) the object is not within any border area of the scene and not adjacent to any areas that users want to exclude; 3) the object has moved away at least predetermined distance from the location where the object first appears in the scene; 4) the size of the object has been determined to be persistent.

If the current location of the object supports updating of the object aspect ratio and directional aspect ratio, the track of the object can be examined to determine whether the object is undergoing a salient move (stage 606). A salient move is one where the object has moved consistently in one direction for at least a predetermined threshold distance. A salient move direction for an object represents a direction along which the object has moved consistently a significant distance. An object can be represented by either a bounding box or its contour, and the position of the bounding box or the contour can be compared from frame to frame to determine whether the object has made a salient move.

If the object has not made a salient move, the object's aspect ratio and directional aspect ratio will not be calculated and the method continues with stage 603 to proceed to process next unprocessed track. If the object makes no salient move, the object is not classified at this frame (since it has not been justified as a persistently tracked object in stage 604). But, the object is not considered as a part of the background, and the object can be classified in later frames if the object becomes persistent.

If the object has made a salient move, the object's aspect ratio is calculated (stage 608) and the object's directional aspect ratio is calculated (stage 607). The aspect ratio of the object is ratio of the height of the object to the width of the object in the two-dimensional image frame. The directional aspect ratio of the object represents the ratio of the object's length in perpendicular direction vs. that in the parallel direction in terms of the salient move direction. The aspect ratio of some object may change as the object changes directions. For example, the aspect ratio of a vehicle traveling from left to right across a frame may change if the vehicle makes a turn and begins to move either up or down in the frame. Most vehicles are longer than they are wide. Therefore, the aspect ratio of the vehicle is likely to change depending on the direction that the vehicle is traveling. The width of the object representing the vehicle is likely to be greater than the height as the vehicle moves horizontally across the frame and the height of the object representing the vehicle is likely to be greater when the vehicle is moving vertically along the frame. However, the directional aspect ratio of a vehicle is likely to remain constant, regardless of the direction that the vehicle moves in the scene. In contrast, the aspect ratio of a person is likely to appear to be relatively constant for a person that appears in the scene being monitored. The aspect ratio of the person is not likely to change regardless of where the person appears in the scene or of the person's direction of travel. However, the directional aspect ratio of the person is likely to change as the person changes direction of motion. The differences between the aspect ratios and the directional aspect ratios of objects can be used to help classify the objects.

The directional clusters of track (T) can then be updated with the aspect ratio information (stage 611) and the directional aspect ratio information (stage 610) associated with the object. An object can have directional clusters associated with the aspect ratio of the object and have directional clusters associated with the directional aspect ratio of the object. If an object does not have a directional cluster for aspect ratio associated with that object, a directional cluster for aspect ratio can be created for that object. Furthermore, if an object does not have a directional cluster for directional aspect ratio associated with that object, a directional cluster for directional aspect ratio can be created for that object.

The directional clusters can be updated using three-Gaussian mixture modeling, which automatically learns the statistics of these two aspect ratios associated with the move direction of the object. For example, the full direction range of 360 degrees (from −180 degree to 180 degree) may be quantized into 18 bins, each covering two opposite 10 degree range (e.g., the first direction bin ranging from −5 to 5 degree and from −175 to 175 degree in the Cartesian coordinate system). Each direction bin can have three Gaussian models, each of which is characterized by three values: count (probability), mean, and standard derivation of (directional) object aspect ratios related to the salient move direction of the track.

The object can then be classified based on the track's directional clusters (stage 613). If a track's directional clusters have relatively similar mean values of object aspect ratio within a preset range (e.g., ranging from 2 to 5) for all obtained direction bins (including at least a direction bin of more than 45 degrees away from the vertical direction) the object could be identified as a person because the object aspect ratio keeps constant regardless of the object's move directions. Similarly, the object can be identified as a car if a track's directional clusters have similar mean values of directional object aspect ratio in another preset range (e.g., ranging from 0.25 to 0.5) in all obtained direction bins.

The object can then be classified using the object's two aspect ratios (stage 613). When an object is classified using the object's two aspect ratios, a histogram of track-level classification results can be updated. The class bin with the maximum counts in this histogram can be used to determine the object's current temporary result of track-level classification. The object's track-level classification result can also be used to update the statistics of the global cluster to which the object belongs (if available), including the histogram of track-level classification results and the directional clusters of the two aspect ratios (stage 615). The track-level classification results can be used to map the global clusters to real object types. This mapping will be addressed in detail below. The formation of global clusters is also discussed in detail below.

A clustering process is also carried out to group object into clusters based on the size of the objects. The clustering information can be used to help classify the objects. The clustering process includes two types of clustering: grid-level clustering and scene-level clustering. For computational efficiency, a camera's entire field of view can be reduced into an array of grids (grid map) by downscaling either uniformly or according to the camera's perspective information (if available). For example, a scene of 640×480 pixels can be represented using an 80×60 grid map via an 8×8 down-scaling. Each grid in the map corresponds to a local scene area and has Gaussian mixture models associated with that grid. Whenever a persistently tracked object visits a grid area, the Gaussian mixture model associated with that grid can be updated with object size information.

The clustering process begins with calculating an object size for the object associated with the track (T) (stage 609). The Gaussian mixture models associated with the grid areas visited by the object can be updated based on the object size associated with the object (stage 612).

The object's size can be used to find a matching Gaussian model (M) at the track's object center (stage 614). When a tracked object matches a local grid model at the location of the object's center, the track and the matched local grid model can interact to initialize or update global clusters (stage 616). The interactions between the track and the local grid model are described in detail below.

Once a tracked object is matched to a global cluster in terms of its object size feature, the object is assigned an object type (stage 617). The object is assigned an object type through an existing cluster-to-type mapping (if available), and the size-derived object is further combined with the object's track-level derived object type for a final classification decision of a determined object type associated with the object (stage 618).

Building Global Clusters

Figure 7:
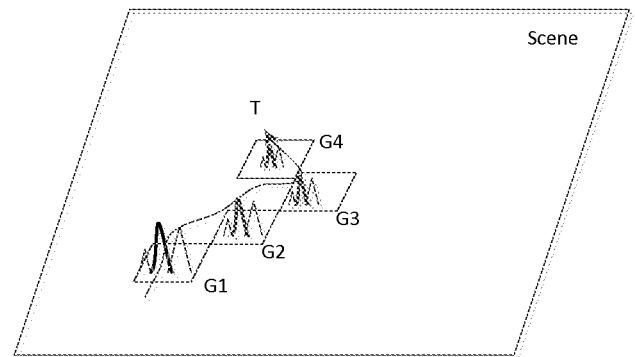
FIG. 7 provides an example that illustrates how the techniques illustrated in FIG. 6 can be applied to propagating objects' track information to obtain global clusters.

FIG. 7 provides an example that illustrates how the techniques illustrated in FIG. 6 can be applied to propagating objects' track information to obtain global clusters. The clustering-based process illustrated in FIG. 7 operates by identifying and maintaining spatially native (local) clusters of object size over the entire field of view of the camera (the scene). These local clusters can be connected or linked together to form global clusters based on object tracks. In the example illustrated in FIG. 7, the track (T) of the object being tracked has visited four grids (G1, G2, G3, and G4). Each of the grids, G1, G2, G3, and G4, has local clusters associated with them that are represented in terms of three Gaussian models of object sizes. Those models that match track T (indicated by the peaks illustrated in bold lines) form a global cluster and carry statistical information, such as the probability, mean and standard deviation of object sizes of the cluster to which track T belongs in the identified grid areas.

Updating Global Clusters

This section describes techniques for updating global clusters that can be used with the methods illustrated in FIGS. 4-6. A grid is considered to be "hit" by a track if the grid falls within a predetermined distance from the track's object center. If a grid falls within this predetermined distance, the local models associated with that grid can be updated using the mechanism of Gaussian mixture modeling.

This section focuses on how to build up and maintain a list of global clusters for a monitored scene. The following defines some of the terminology used herein. An object track (or local model) that has already been assigned to a global cluster is referred to herein as a clustered track (or a clustered model). The object track (or the local model) bears the id of the cluster to which the track belongs. Otherwise, if a track (or local model) has not been assigned to global cluster, the object track (or the local model) is referred to as an un-clustered object track (or an un-clustered model).

If an un-clustered track hits a clustered model, the un-clustered track takes on the cluster id of the clustered model. If an un-clustered track hits an un-clustered model that lasts long enough (greater than a predetermined length of time) in term of its count (probability), a new global cluster id is created for this model and the track also takes this new cluster id, indicating the track is assigned this new cluster. If the track then visits other locations in the scene, the new cluster id associated with the track can be propagated to those locations visited by the track.

If a clustered track hits an un-clustered model, the un-clustered model takes the cluster id of the clustered track while the matched model is pushed into the constituent model list of the global cluster. This approach provides one method to distribute a global cluster id over a scene through tracks.

Figure 8:
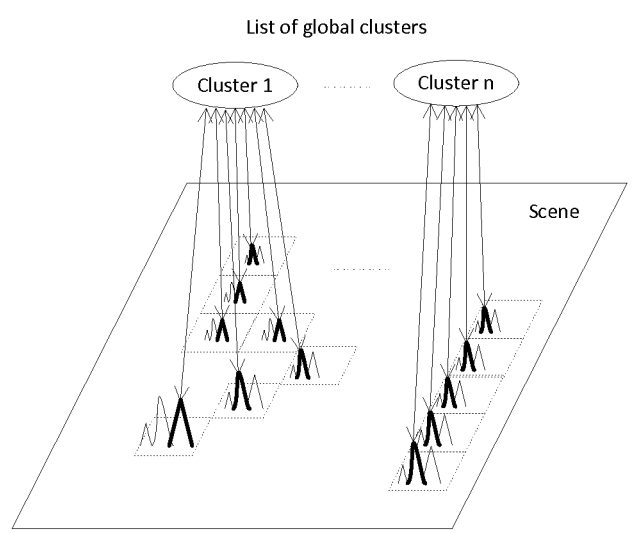
FIG. 8 is an example diagram that illustrates the relationship between global clusters and local models.

An illustrative example is presented in FIG. 8 to illustrate the relationship between global clusters and their constituent local models. For a given global cluster, the associated local models that belong to the cluster are maintained as indicated by the directed lines starting from the cluster in FIG. 8. For a given clustered local model, the global cluster that the local model belongs to is recorded. In the example illustrated in FIG. 8, there are two global clusters visible, global cluster 1 and global cluster n. The local models associated with each of these global clusters are identified by bidirectional arrows that point from the global clusters to their constituent local models. The bidirectional links between the global clusters and the global cluster's respective local models provide a flexible way to support the manipulation and modification of global clusters.

If a clustered track hits a clustered model that is associated with a different cluster (where the cluster ids differ), the two global clusters may be merged. For example, the two global clusters can be merged if the aspect ratio and the directional aspect ratio associated with the clusters (see stage 615 of FIG. 6) agree with each other in their directional clusters of both aspect ratios. However, if either of the track's object aspect ratios exceeds a predetermined distance from the mean of the global cluster associated with the clustered model that was hit by the clustered track (in a relative sense of the standard deviation), a conflict between the clustered track and the clustered model has occurred, and the clustered track and the clustered model are not merged.

During the process of merging two global clusters, potential conflicts are monitored by analyzing a feature map of object size for the cluster to which the global cluster associated with the current track is to be merged. A feature map is an image that shows the average values of the object size feature across the scene for a global cluster. For example, for a still camera that is positioned to look down and forward, an object can appear gradually smaller as the object moves away from the camera. Accordingly, the average object size value of an object type in a location distant from the camera should be smaller than the average object size value of that object type when the object is closer to the camera. To account for this affect, a feature map is created for each global cluster with each of its pixel values indicating the average size at the related grid in the scene. If two unrelated global clusters were merged, the merger could introduce noise into the feature image, resulting in pixels having significantly higher or lower values than their neighbors. If two global clusters near one another have very different feature values, this can indicate that the clusters are poor candidates for merger and potential merge errors can be prevented by avoiding a merge under these circumstances. In view of this, a noise removal process can be periodically conducted to remove those grid models that are not compatible with their surrounding area to reducing conflicts among neighboring grids.

Each of the global clusters can maintain a record of the track-level classification results in the form of a histogram of object types to which the constituent tracks belong. A track is considered to a constituent track of a global cluster if the track is a clustered track of the global cluster. A majority voting scheme can be adopted to map the global cluster to the object type that has maximum counts. Accordingly, the mapping between the global clusters and the object types can be automatically established.

Determining Final Object Classification Results

How the final object classification results are determined can depend on the availability of the two classification results described above: the track-level results (in terms of the track derived object type) and global clustering results (in terms of clustering based object types). If only one of the classification results is available, the available results are used as the final object classification result. If both classification results are available and both results agree on a track's object type, either of the results is selected as the final object classification result.

In the event that both classification results are available but the results conflict, the global cluster derived results are selected as the final object classification result over the track-level results. The global cluster derived results are selected, because the object size is generally a more reliable feature than the two aspect ratios (i.e., object aspect ratio and directional object aspect ratio) in categorizing objects due to how robustly the video analytics algorithms are able to determine these features. In implementations where the video analytics algorithms are able to more robustly determine the object aspect ratios and a results conflict occurs, the track-level results can be selected as the final object classification. The object size feature can be inferior to the two aspect ratios for recognizing object types due to the spatially variant nature of object size in the scene.

Figure 9:
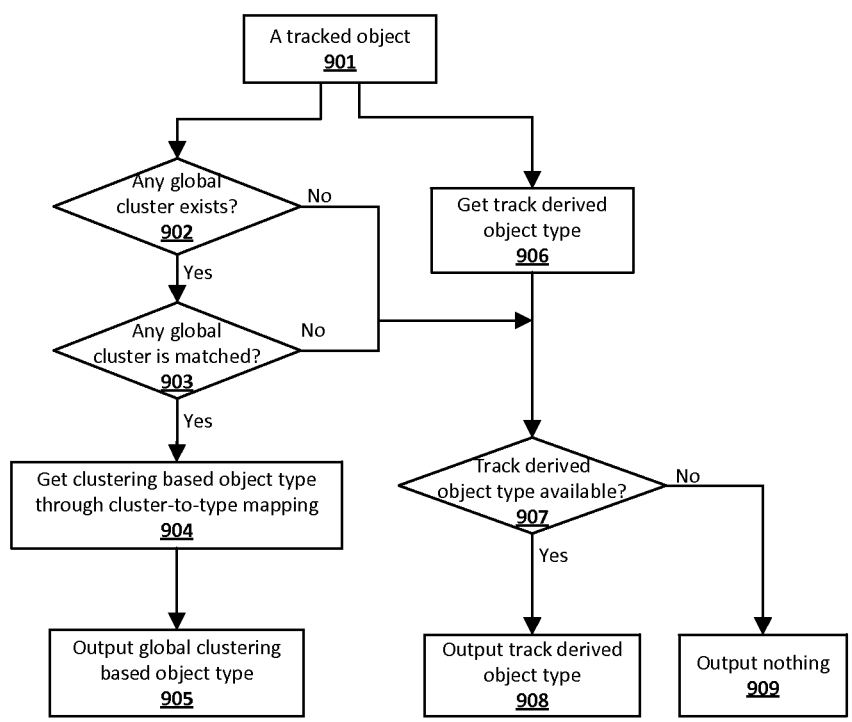
FIG. 9 is a flow diagram illustrating a method for determining the final object classification results based on the track-level results (in terms of the track derived object type) and global clustering results (in terms of clustering based object types).

FIG. 9 is a flow diagram illustrating a method for determining the final object classification results based on the track-level results (in terms of the track derived object type) and global clustering results (in terms of clustering based object types). The method illustrated in FIG. 9 corresponds to step 618 of the method illustrated in FIG. 6. A tracked object is selected for classification from the objects extracted from the video content captured by video camera 105 (stage 901). A determination is made whether there are global cluster data available to match the tracked object (stage 902). If there is global cluster data available, a determination is made whether the tracked object has global cluster data associated with that tracked object (stage 903). If the answer is no to the determinations in stage 902 or 903, a cluster-derived object type cannot be assigned to the object. Therefore, the final object-type determination can be made using track-level classification. If there is global cluster data available and tracked object is associated with a global cluster, the cluster-based object type can be obtained from the global cluster information through cluster-to-type mapping (stage 904). The cluster-based object type can then be output as the final object classification results (stage 905).

Track-level classification steps can also be performed. The track-derived object type associated with the object can be obtained (stage 906). A determination can be made whether the track-derived object type was determined for the object (stage 907). If the track-derived object type is available, the track-derived object type can be output as the final object classification results (stage 908). Otherwise the track-derived object type is not available, and no determination is output (stage 909).

With the above decision rules, correct classification can be still obtained when the monitored scene involves gradual change of shadows and lighting reflections, as is usually the case for an outdoor scene in a sunny day or a night scene affected by reflections of a passing vehicle's lights. With shadows and reflections, object aspect ratio and directional object aspect ratio obtained from video analytics approaches can vary largely from the expected range of a typical object type, which will make invalid the prior assumption used in the track-level classification. However, with global clusters adapted to gradually changing object sizes in the scene, objects of a same type can still be clustered into a same global cluster due to the use of learning scheme and ability to evolve with changing parameters. As long as the mapping from global clusters to object types is valid, the global clustering-based classification can still produce correct results.

In order to build a correct mapping from global clusters to object types, a conservative strategy can be adopted for updating global clusters' statistics (a histogram of object types) by taking into account only highly confident track-level classification results. Thus, an updated global cluster can still keep the record of previously (with high confidence) track-level classification results while updating its size features to noisy scene, to ensure the correctness of classification from the global clustering.

Furthermore, non-singleton object types, such as group of people, can be detected by comprehensively analyzing the two aspect ratios and by referring to the object size values of global clusters, as well as by considering additional features (e.g., object shape) if possible. Basically, this invention offers an approach to categorizing objects into scene-level clusters according to object sizes while classifying objects using the two aspect ratios for looking down-forward still cameras. However, the techniques disclosed herein can be utilized in various ways to benefit video surveillance applications. For instance, the global clustering method could be applied to any object feature (rather than just object size) to form scene-level clusters, which could provide statistics summarization for selected features and benefit the extraction of semantic information about scene activities. In another example, with the learned clusters of a known object type (e.g., person) in the scene, cameras could be calibrated automatically.

Example Final Object Classification Results

Figure 10A:
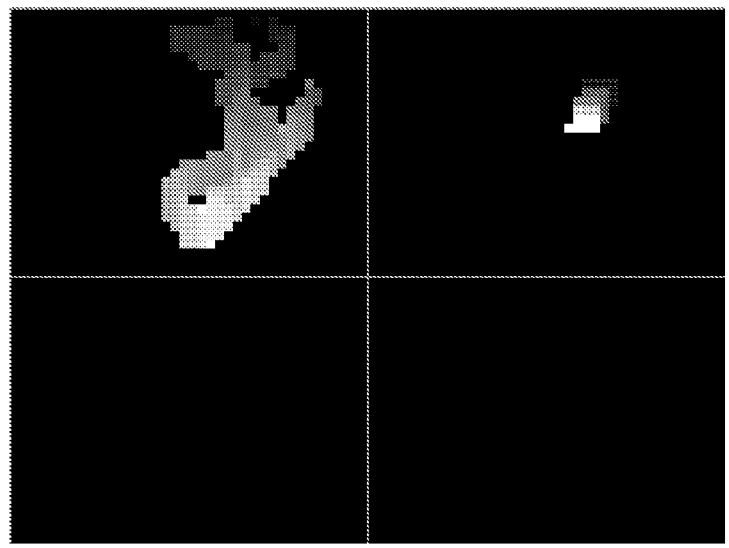
FIGS. 10A, 10B, and 10C illustrate example feature maps.
Figure 10B:
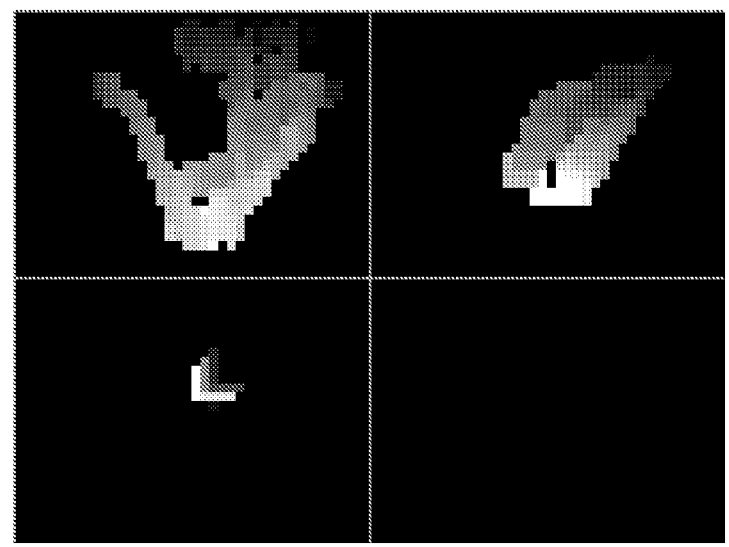
Figure 10C:
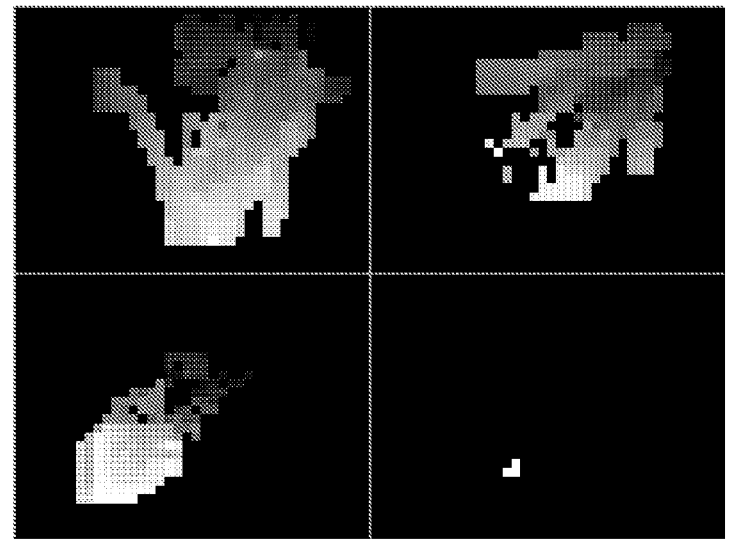
Figure 11A:
FIGS. 11A, 11B, and 11C illustrate example object classification results.
Figure 11B:
Figure 11C:

FIGS. 10A-10C and 11A-11C illustrate some examples of features maps and object classification results according to the various techniques disclosed herein. The FIG. 10A illustrates a feature map obtained after processing 558 image frames of video content captured by a video camera. FIG. 11A illustrates the corresponding image of frame 558 captured by the video camera together with classification results. FIG. 10B illustrates a feature map obtained after processing 1174 image frames of the video content captured by the same camera on the same scene. FIG. 11B illustrates the corresponding image of frame 1174 and classification results at that frame. FIG. 10C illustrates a feature map for frame number 5462 and FIG. 11C illustrates the image of frame 5462 captured by the video camera and classification results at that frame. FIGS. 10A, 10B, and 10C each include four feature maps. Each pixel value in a feature map indicates an average value of object size at the related grid for the associated global cluster such that a brighter value corresponds to a larger object size. The top-left feature map corresponds to global cluster 1, the top-right feature map corresponds to global cluster 2, the bottom-left feature map corresponds to global cluster 3, and the bottom-right feature map corresponds to global cluster 4.

In general, at the beginning of a run of the proposed object classification techniques described above, the global clusters are fragile, small and spatially spread out in the scene. As the learning process proceeds and more activities occur in the scene, global clusters merge gradually and become larger and the number of clusters may keep decreasing and converge to the true number of object types which have appeared in the scene. In this example, cluster 1 represents object type "person" via the automatically obtained cluster-to-type mapping, cluster 2 represents object type "car", and cluster 3 for object type "van" while cluster 0 indicates an object type that has not yet identified so far or are unknown, which may be classified into a specific class or remain unclassified forever depending on its future objects and the locations they will visit in the scene. These mappings can be justified by the object type id put above the tracked objects in FIGS. 11A, 11B and 11C.

The various illustrative logical blocks, modules, and algorithm stages described may be implemented as electronic hardware, computer software, or combinations of both. To clearly illustrate this interchangeability of hardware and software, various illustrative components, blocks, modules, and stages have been described above generally in terms of their functionality. Whether such functionality is implemented as hardware or software depends upon the design constraints imposed on the overall system. The described functionality can be implemented in varying ways. In addition, the grouping of functions within a module, block or stage is for ease of description. Specific functions can be moved from one module or block without departing from the disclosure.

The various illustrative logical blocks and modules described can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, multiple microprocessors, one or more microprocessors in conjunction with a DSP core, or any other such configuration.

The operations of a method or algorithm described may be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various changes and modifications could be made to the descriptions provided above without departing from the scope of the disclosure or the appended claims. For example, although elements may be described or claimed in the singular, the plural may be included. Additionally, all or portions of aspects and/or embodiments may be utilized with other aspects and/or embodiments.

What is claimed is:

1. A method for identifying objects in video content comprising:
   receiving video content of a scene captured by a video camera;
   detecting an object in the video content;
   identifying a track that the object follows over a series of frames of the video content;
   extracting object features for the object from the video content; and
   classifying the object based on the object features, wherein classifying the object further comprises:
      determining a track-level classification for the object using spatially invariant object features including an aspect ratio and a directional aspect ratio associated with the object by
         constructing directional clusters associated with the aspect ratio for the object,
         constructing directional clusters associated with the directional aspect ratio for the object,
         determining the track-level classification for the object based on the directional clusters associated with the aspect ratio and the directional clusters associated with directional aspect ratio, and
         updating a histogram of track-level classification results for the tracked object based on the track-level classification;
      determining a global-clustering classification for the object using spatially variant features; and
      determining an object type for the object based on the track-level classification and the global-clustering classification for the object.

2. The method of claim 1 wherein determining the global-clustering classification for the object further comprises determining the global-clustering classification for the object based on a size of the object.

3. A method for identifying objects in video content comprising:
   receiving video content of a scene captured by a video camera;
   detecting an object in the video content;
   identifying a track that the object follows over a series of frames of the video content;
   extracting object features for the object from the video content; and
   classifying the object based on the object features, wherein classifying the object further comprises:
      determining a track-level classification for the object using spatially invariant object features;
      determining a global-clustering classification for the object using spatially variant features including the size of the object; and determining an object type for the object based on the track-level classification and the global-clustering classification for the object, wherein determining the global-clustering classification for the object further comprises:

updating local models of object size for locations visited by a persistently tracked object; and updating global clusters by associating local models with the global clusters, the local models having an object size matching that associated with the global cluster and are visited by the persistently tracked object.

4. The method of claim 3 wherein updating the global clusters further comprises:

updating a histogram of track-level classification results associated with matched objects;

updating directional clusters based on the matched objects, the directional clusters being associated with directional aspect ratio and aspect ratio of tracked objects;

creating a feature map of object size for each global cluster to resolve conflicts in global cluster merges; and creating cluster-to-type mapping to convert a global cluster to a determined object type.

5. A method for identifying objects in video content comprising:

receiving video content of a scene captured by a video camera;

detecting an object in the video content;

identifying a track that the object follows over a series of frames of the video content;

extracting object features for the object from the video content; and classifying the object based on the object features, wherein classifying the object further comprises:

determining a track-level classification for the object using spatially invariant object features;

determining a global-clustering classification for the object using spatially variant features;

determining whether the object has moved consistently in one direction for at least a predetermined threshold distance;

if the object has moved more than the predetermined threshold distance, determining an object type for the object based on the track-level classification and the global-clustering classification for the object, and if the object has not moved more than the predetermined threshold distance, determining the object type for the object based on the global-clustering classification and not the track-level classification of the object.

6. A surveillance system comprising a server configured to identify objects in video content captured by a video camera, the system comprising:

means for receiving video content of a scene captured by a video camera;

means for detecting an object in the video content;

means for identifying a track that the object follows over a series of frames of the video content;

means for extracting object features for the object from the video content; and means for classifying the object based on the object features, wherein classifying the object further comprises:

means for determining a track-level classification for the object using spatially invariant object features including an aspect ratio and a directional aspect ratio associated with the object, the means for determining the track-level classification comprising means for constructing directional clusters associated with the aspect ratio for the object, means for constructing directional clusters associated with the directional aspect ratio for the object, means for determining the track-level classification for the object based on the directional clusters associated with the aspect ratio and the directional clusters associated with directional aspect ratio, and means for updating a histogram of track-level classification results for the tracked object based on the track-level classification;

means for determining a global-clustering classification for the object using spatially variant features; and means for determining an object type for the object based on the track-level classification and the global-clustering classification for the object.

7. The system of claim 6 wherein the means for determining the global-clustering classification for the object further comprises means for determining the global-clustering classification for the object based on a size of the object.

8. A surveillance system comprising a server configured to identify objects in video content captured by a video camera, the system comprising:

means for receiving video content of a scene captured by a video camera;

means for detecting an object in the video content;

means for identifying a track that the object follows over a series of frames of the video content;

means for extracting object features for the object from the video content; and means for classifying the object based on the object features, wherein classifying the object further comprises:

means for determining a track-level classification for the object using spatially invariant object features;

means for determining a global-clustering classification for the object using spatially variant features; and means for determining an object type for the object based on the track-level classification and the global-clustering classification for the object, wherein the means for determining the global-clustering classification for the object further comprises:

means for updating local models of object size for locations visited by a persistently tracked object;

means for updating global clusters by associating local models with the global clusters, the local models having an object size matching that associated with the global cluster and are visited by the persistently tracked object.

9. The system of claim 8 wherein the means for updating the global clusters further comprises:

means for updating a histogram of track-level classification results associated with matched objects;

means for updating directional clusters based on the matched objects, the directional clusters being associated with directional aspect ratio and aspect ratio of tracked objects;

means for creating a feature map of object size for each global cluster to resolve conflicts in global cluster merges; and means for creating cluster-to-type mapping to convert a global cluster to a determined object type.

10. A surveillance system comprising a server configured to identify objects in video content captured by a video camera, the system comprising:

means for receiving video content of a scene captured by a video camera;

means for detecting an object in the video content;

means for identifying a track that the object follows over a series of frames of the video content;
means for extracting object features for the object from the video content; and
means for classifying the object based on the object features, wherein classifying the object further comprises
means for determining a track-level classification for the object using spatially invariant object features,
means for determining a global-clustering classification for the object using spatially variant features,
means for determining whether the object has moved consistently in one direction for at least a predetermined threshold distance;
means for determining an object type for the object based on the track-level classification and the global-clustering classification for the object if the object has moved more than the predetermined threshold distance; and
means for determining the object type for the object based on the global-clustering classification and not the track-level classification of the object if the object has not moved more than the predetermined threshold distance.

11. A surveillance system for identifying objects in video content captured by a video camera, the system comprising:
a non-transitory computer-readable memory;
a plurality of modules comprising processor executable code stored in the memory;
a processor connected to the memory and configured to access the plurality of modules stored in the memory; and
a video processing module configured to:
receive video content of a scene captured by a video camera;
detect an object in the video content;
identify a track that the object follows over a series of frames of the video content;
extract object features for the object from the video content; and
classify the object based on the object features, wherein to classify the object the video processing module is further configured to:
determine a track-level classification for the object using spatially invariant object features including an aspect ratio and a directional aspect ratio associated with the object, the video processing module being configured to
construct directional clusters associated with the aspect ratio for the object,
construct directional clusters associated with the directional aspect ratio for the object,
determine the track-level classification for the object based on the directional clusters associated with the aspect ratio and the directional clusters associated with directional aspect ratio, and
update a histogram of track-level classification results for the tracked object based on the track-level classification;
determine a global-clustering classification for the object using spatially variant features; and
determine an object type for the object based on the track-level classification and the global-clustering classification for the object.

12. The system of claim 11 wherein the video processing module being configured to determine the global-clustering classification for the object is further configured to determine the global-clustering classification for the object based on a size of the object.

13. A surveillance system for identifying objects in video content captured by a video camera, the system comprising:
a non-transitory computer-readable memory;
a plurality of modules comprising processor executable code stored in the memory;
a processor connected to the memory and configured to access the plurality of modules stored in the memory; and
a video processing module configured to:
receive video content of a scene captured by a video camera;
detect an object in the video content;
identify a track that the object follows over a series of frames of the video content;
extract object features for the object from the video content; and
classify the object based on the object features, wherein to classify the object the video processing module is further configured to:
determine a track-level classification for the object using spatially invariant object features;
determine a global-clustering classification for the object using spatially variant features; and
determine an object type for the object based on the track-level classification and the global-clustering classification for the object, wherein the video processing module being configured to determine the global-clustering classification for the object is further configured to:
update local models of object size for locations visited by a persistently tracked object;
update global clusters by associating local models with the global clusters, the local models having an object size matching that associated with the global cluster and are visited by the persistently tracked object.

14. The system of claim 13, and wherein the video processing module being configured to update the global clusters is further configured to:
update a histogram of track-level classification results associated with matched objects;
update directional clusters based on the matched objects, the directional clusters being associated with directional aspect ratio and aspect ratio of tracked objects;
create a feature map of object size for each global cluster to resolve conflicts in global cluster merges; and
create cluster-to-type mapping to convert a global cluster to a determined object type.

15. A surveillance system for identifying objects in video content captured by a video camera, the system comprising:
a non-transitory computer-readable memory;
a plurality of modules comprising processor executable code stored in the memory;
a processor connected to the memory and configured to access the plurality of modules stored in the memory; and
a video processing module configured to:
receive video content of a scene captured by a video camera;
detect an object in the video content;
identify a track that the object follows over a series of frames of the video content;
extract object features for the object from the video content; and classify the object based on the object features, wherein to classify the object the video processing module is further configured to:
- determine a track-level classification for the object using spatially invariant object features;
- determine a global-clustering classification for the object using spatially variant features;
- determine whether the object has moved consistently in one direction for at least a predetermined threshold distance;
- determine an object type for the object based on the track-level classification and the global-clustering classification for the object if the object has moved more than the predetermined threshold distance; and
- determine the object type for the object based on the global-clustering classification and not the track-level classification of the object if the object has not moved more than the predetermined threshold distance.

16. A non-transitory computer-readable medium, having stored thereon computer-readable instructions identifying objects in video content, comprising instructions configured to cause a computer to:
- receive video content of a scene captured by a video camera;
- detect an object in the video content;
- identify a track that the object follows over a series of frames of the video content;
- extract object features for the object from the video content; and
- classify the object based on the object features, wherein the instruction to cause the computer to classify the object further comprise instructions to cause the computer to:
  - determine a track-level classification for the object using spatially invariant object features, the code to cause the computer to determine the track-level classification for the object further comprises code to cause the computer to
    - construct directional clusters associated with the aspect ratio for the tracked object,
    - construct directional clusters associated with directional aspect ratio for the tracked object,
    - determine the track-level classification for the object based on the directional clusters associated with the aspect ratio and the directional clusters associated with directional aspect ratio, and
    - update a histogram of track-level classification results for the tracked object based on the track-level classification;
  - determine a global-clustering classification for the object using spatially variant features; and
  - determine an object type for the object based on the track-level classification and the global-clustering classification for the object.

17. The medium of claim 16 wherein the code to cause the computer to determine the global-clustering classification for the object further comprises code to cause the computer to determine the global-clustering classification for the object based on a size of the object.

18. A non-transitory computer-readable medium, having stored thereon computer-readable instructions identifying objects in video content, comprising instructions configured to cause a computer to:
- receive video content of a scene captured by a video camera;
- detect an object in the video content;
- identify a track that the object follows over a series of frames of the video content;
- extract object features for the object from the video content; and
- classify the object based on the object features, wherein the instruction to cause the computer to classify the object further comprise instructions to cause the computer to:
  - determine a track-level classification for the object using spatially invariant object features;
  - determine a global-clustering classification for the object using spatially variant features; and
  - determine an object type for the object based on the track-level classification and the global-clustering classification for the object,
  - wherein the code to cause the computer to determine the global-clustering classification for the object further comprises code to cause the computer to:
    - update local models of object size for locations visited by a persistently tracked object; and
    - update global clusters by associating local models with the global clusters, the local models having an object size matching that associated with the global cluster and are visited by the persistently tracked object.

19. The system of claim 18, wherein the code to update the global clusters further comprises code to cause the computer to:
- update a histogram of track-level classification results associated with matched objects;
- update directional clusters based on the matched objects, the directional clusters being associated with directional aspect ratio and aspect ratio of tracked objects;
- create a feature map of object size for each global cluster to resolve conflicts in global cluster merges; and
- create cluster-to-type mapping to convert a global cluster to a determined object type.

20. A non-transitory computer-readable medium, having stored thereon computer-readable instructions identifying objects in video content, comprising instructions configured to cause a computer to:
- receive video content of a scene captured by a video camera;
- detect an object in the video content;
- identify a track that the object follows over a series of frames of the video content;
- extract object features for the object from the video content; and
- classify the object based on the object features, wherein the instruction to cause the computer to classify the object further comprise instructions to cause the computer to:
  - determine a track-level classification for the object using spatially invariant object features;
  - determine a global-clustering classification for the object using spatially variant features;
  - determine whether the object has moved consistently in one direction for at least a predetermined threshold distance;
  - determine an object type for the object based on the track-level classification and the global-clustering classification for the object; and
  - determine the object type for the object based on the global-clustering classification and not the track-level classification of the object if the object has not moved more than the predetermined threshold distance.

* * * * *